United States Patent [19]

Doty

[11] Patent Number: 5,580,091
[45] Date of Patent: Dec. 3, 1996

[54] ENERGY MANAGEMENT DEVICE FOR USE WITH SAFETY BELT RETRACTORS

[75] Inventor: Gerald A. Doty, Auburn Hills, Mich.

[73] Assignee: Takata Inc., Auburn Hills, Mich.

[21] Appl. No.: 554,343

[22] Filed: Nov. 6, 1995

Related U.S. Application Data

[63] Continuation of Ser. No. 322,269, Oct. 13, 1994, abandoned.

[51] Int. Cl.$^6$ ........................................... B60R 22/28
[52] U.S. Cl. .......................... 280/805; 188/371; 297/472
[58] Field of Search ................................. 280/805, 806; 188/371; 297/472

[56] References Cited

U.S. PATENT DOCUMENTS

| | | | |
|---|---|---|---|
| 3,232,383 | 2/1966 | Moberg | 188/375 |
| 3,289,792 | 12/1966 | Moberg | 188/375 |
| 3,649,786 | 3/1972 | Mauron | 280/805 |
| 3,694,028 | 9/1972 | Andres et al. | 280/805 |
| 3,765,700 | 10/1973 | Littmann | 280/805 |
| 3,973,650 | 8/1976 | Nagazumi | 280/805 |
| 4,239,260 | 12/1980 | Hollowell | 280/806 |
| 4,273,361 | 6/1981 | Takei et al. | 280/805 |
| 4,886,296 | 12/1989 | Brodmann | 280/805 |

FOREIGN PATENT DOCUMENTS

| | | |
|---|---|---|
| 1542968 | 10/1968 | France . |
| 2141668 | 3/1973 | Germany . |
| 50-28499 | 8/1975 | Japan . |
| 62-20060 | 12/1987 | Japan . |
| 2217973 | 11/1989 | United Kingdom . |

OTHER PUBLICATIONS

European Search Report dated Jan. 15, 1996 re Application No. 95114491.4.

*Primary Examiner*—Kenneth R. Rice
*Attorney, Agent, or Firm*—Fitch, Even, Tabin & Flannery

[57] ABSTRACT

A low-cost energy management device for dissipating a portion of the energy imparted to a safety belt in a rapid vehicular deceleration is preferably comprised of two pieces, viz., a strap and a channel-shaped guide and deflector member. The strap has a row of deflectable tabs or beams and is mounted to the vehicle. The channel-shaped guide and deflector member is secured to a seat belt retractor and straddles the strap and slides along the strap rectilinearly and guides the retractor in this linear sliding movement along the strap while an integral depending deflector portion on the channel-shaped member deflects the beams. The deflecting portion engages two adjacent, spaced, deflected beams on the strap and these spaced deflected abutting the deflecting portion aid in aligning the deflector member to travel in a straight line path. The guiding and deflecting member has staking tabs to stake the channel-shaped member to the retractor in a low-cost manner. The cantilevered beams are deflected at a known deflection force and hence, a series of them provides a reduction in the maximum load that can be calculated.

12 Claims, 7 Drawing Sheets

ENERGY MANAGEMENT DEVICE FOR USE WITH SAFETY BELT RETRACTORS

This application is a continuation of application Ser. No. 08/322,269 filed Oct. 13, 1994 now abandoned.

FIELD OF THE INVENTION

The present invention pertains to devices for use with safety belt retractors for dissipating impact energy generated in the shoulder harness portion of safety belts by a restrained person upon rapid deceleration of a vehicle.

BACKGROUND OF THE INVENTION

A large number of energy management devices for use with vehicle safety belt systems have been proposed, but most of these devices have not been adopted commercially for a number of reasons. One reason is cost in that the pieces used to dissipate the energy have been numerous and complex thereby adding significantly to the cost of the seat belt system. Alternatively, these devices have required or would require significant changes in the current retractor design that would result in substantial costs, if adopted. Another factor is a size limitation. Retractors are often mounted in a vehicle's trim or other locations where only a very limited amount of space is available for the retractor, and hence, the addition of a large and cumbersome energy management device is impractical for applications where limited space is available. In addition to being too costly and too large, a proposed energy management devices may have inconsistent or unpredictable results. This makes it difficult to adapt the system to change the forces actually experienced under dynamic testing conditions in which the energy is dissipated in 100 milliseconds or less. Often such devices rely on tearing of metal sheets or pulling a wide bolt through a narrow slot energy dissipation. It is preferable that the energy management system provide a consistent force and energy dissipation characteristic so that the devices can be tuned to give the desired results under dynamic testing. Also, the energy management devices should be effective in significantly lowering belt loads applied to the occupant and the safety belt hardware, lowering the chest G's experienced by an occupant, lowering the HIC (head injury criteria) numbers, and providing improved occupant performance in crash events to try to achieve a restraint system with a five-star rating. Thus, there is a need for a low-cost, energy management system that meets these difficult criteria.

SUMMARY OF THE INVENTION

In accordance with the present invention, a low-cost, energy management device is provided for dissipating a portion of the kinetic energy imparted to the shoulder harness portion of a vehicular safety belt by the forward thrust of a restrained person in instances of rapid vehicular deceleration, to reduce the maximum force realized by the head and chest regions of the restrained person, and to delay the onset of these maximum forces while an air bag is being deployed.

The preferred energy management device is formed most inexpensively by using only two inexpensive pieces, preferably formed of stamped sheet metal. The first piece is a strap having an elongated slot with spaced pairs of opposed, bendable beams or tabs; and the second piece is a channel-shaped guide and deflector member straddling the strap and fixed to the retractor with an integral portion abutting the beams to deflect the same when the belt load applied to the retractor exceeds a predetermined force, e.g., in the 2.2–2.8 kilo-Newtons range. Preferably, the channel-shaped member is staked to the rear sidewall of the retractor frame to provide a low-cost attachment to existing retractors without a redesign of the retractor frame. The cantilevered metal beams are of a known size and shape and hence, are deflectable with a known amount of applied force, thereby providing a tuned or consistent energy dissipation. For example, a changing of the size of the beams can provide for greater or less force necessary to bend the beams, which can be best determined after running crash sled tests with dynamic loads. When the retractor is pulled forward with a sufficiently large force that the deflector member deflects the first pair of beams, such as in a rapid vehicular deceleration in which the forward thrust of the restrained person on the shoulder harness portion of the safety belt may be large enough to cause deflection of the beams of the strap, the retractor and deflecting member slide forwardly along the strap, deflecting and moving past pairs of the cantilevered beams. Since it takes energy to deflect the beams, the deflection of the beams as the retractor slides forward along the strap dissipates a portion of the energy imparted to the shoulder harness portion of the safety belt. Also, the force is applied over a longer distance as retractor travels, e.g., through about four inches, as the beams are being deflected. Thus, the maximum force realized by the head and chest regions of the restrained person against the shoulder harness portion of the safety belt upon rapid vehicular deceleration is significantly reduced and the time of reaching those maximum forces is delayed. This provides particularly significant reduction in the forces realized by the head and chest regions of the restrained person.

Thus, it will be seen that the energy management device of the present invention may be formed of only two components, a guiding and deflecting member and a strap, each of which may be stamped pieces for low cost production. Also, the guiding and deflecting member may be staked to the retractor frame for easy, low-cost assembly. Additionally, the energy management device of the present invention lends itself to use with currently-existing retractor frames, without the need to redesign the currently-existing retractor frames.

BRIEF DESCRIPTION OF THE DRAWINGS

In the drawings, wherein like elements are referenced alike.

DETAILED DESCRIPTION OF THE PREFERRED EMBODIMENTS

An energy management device embodying various features of the present invention is illustrated in FIGS. 1–4 and 7 and referred to generally by reference numeral 20. The energy management device 20 is for use with a retractor 22 having a frame 24. The retractor 22 is preferably of the type well known in the art having means for locking a belt 26 and preventing its unwinding when the retractor is subjected to a large inertial change and/or rapid initial belt unwinding, which conditions are typically encountered in rapid vehicular deceleration.

Figure 3:
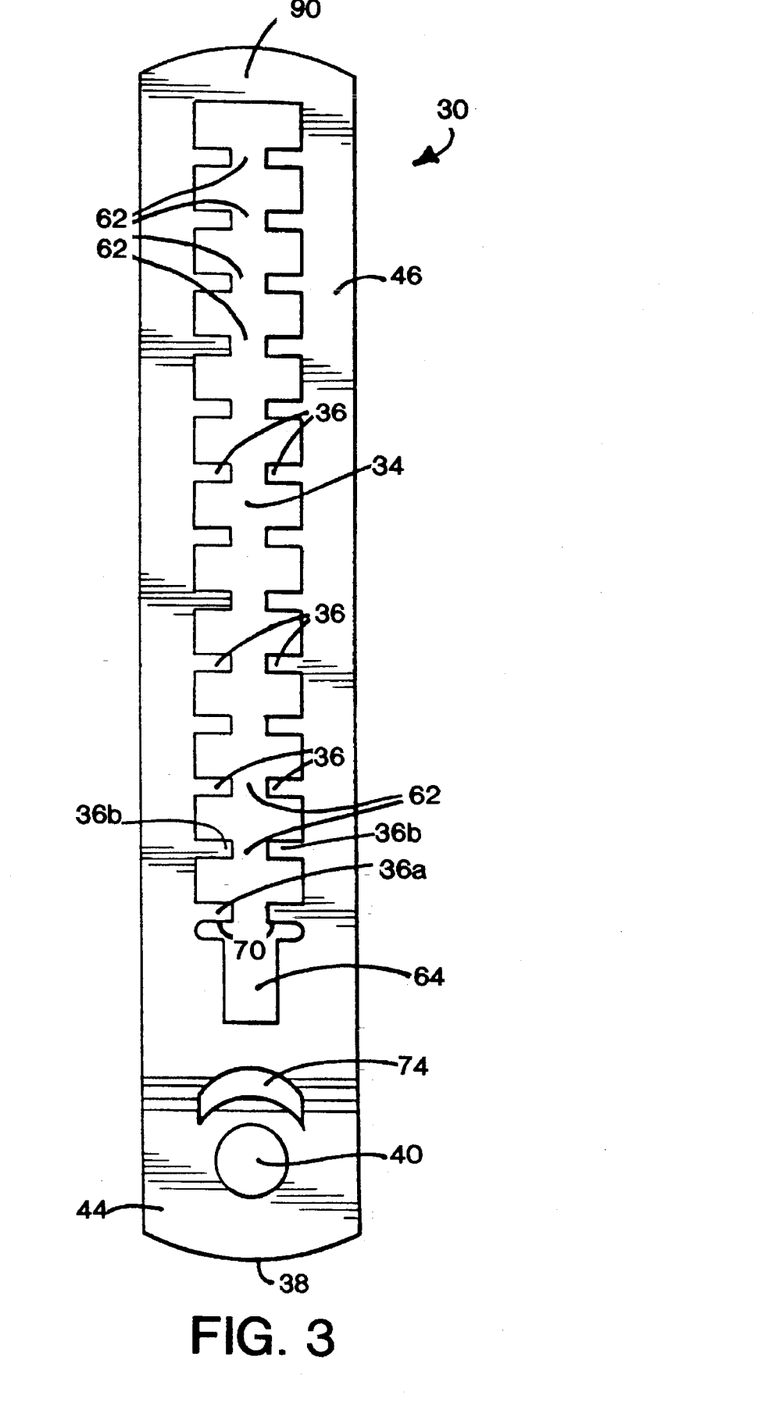
FIG. 3 is a plan view of the strap portion of the energy dissipating device of FIG. 1.

The energy management device comprises a strap 30 and a guiding and deflecting member 32 which may both be produced very inexpensively such as by stamping, and the energy management device 20 of the present invention lends itself to inexpensive assembly and installation also. The strap 30 is preferably a strip of metal having an elongated central opening or slot 34 into which a plurality of opposing pairs of deflectable cantilevered tabs or beams 36 extend. The cantilevered tabs 36 are in the form of beams of steel which have a predetermined cross-section and length from their tips or distal ends 35 to their ends 37 where they are joined to flat strip of steel. Because the beams are of a known length, cross-sectional area and material, they provide an easily calculated and consistent energy dissipation at each pair of deflected beams under loading using a standard tensile machine traveling at 100 millimeters per minute. Under actual dynamic test loading using crash dummies, the speed is very fast, e.g., less than 100 milliseconds; and the forces graphed changed significantly from those graphed when using a tensile machine. Many other energy devices cannot be easily calculated or tuned in the sense of changing their force characteristics; whereas, by changing the size, i.e., cross-sectional area of the beams, the force characteristics can be changed in a systematic manner. The sled tests can be done at high speeds until the desired results are attained. One may change the shape of the beams and their spacing from that illustrated and still fall within the purview of the present invention. As an alternative, a strap was made in which space between each of the opposed beams may be eliminated and the beams may be joined together at their distal ends to form thin, continuous webs (not shown) that extend across the strap 30 and these continuous webs were burst or torn by the member 32 as it was pulled by the seat belt retractor relative to the stationary strap 30 to burst the webs.

The mounting end 38 of the strap 30 has a mounting aperture 40 through which a bolt is received for securely bolting the mounting end of the strap 30 to the vehicle. The strap 30 has a step 42 adjacent the mounting aperture 40 which separates a short mounting surface 44 and an elongated strap surface 46. The step 42 serves to space the strap surface 46 from the vehicle when the mounting surface 44 is mounted flush against the vehicle.

Figure 1:
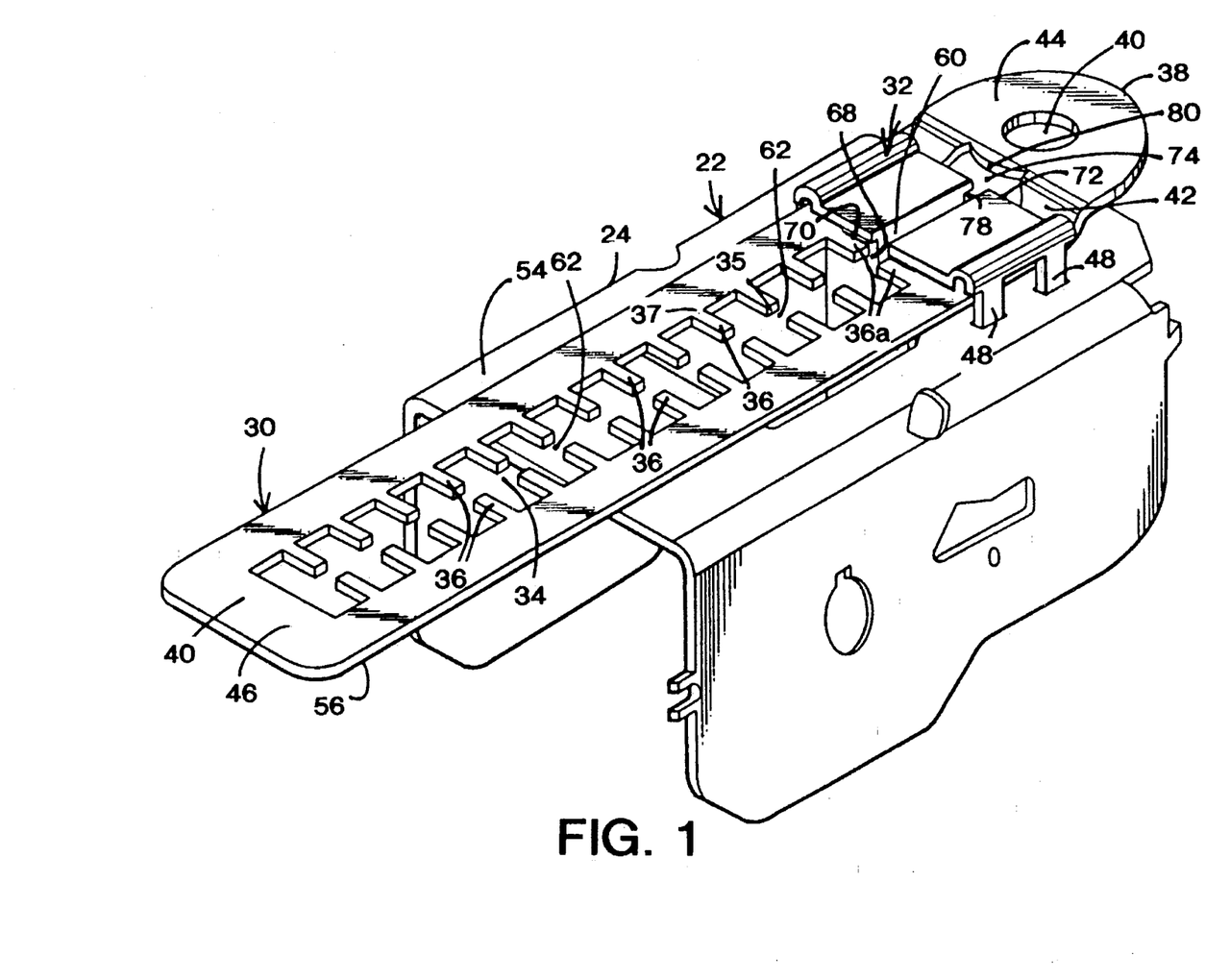
FIG. 1 is a perspective view of a retractor frame and energy dissipating device embodying various features of the present invention.
Figure 2:
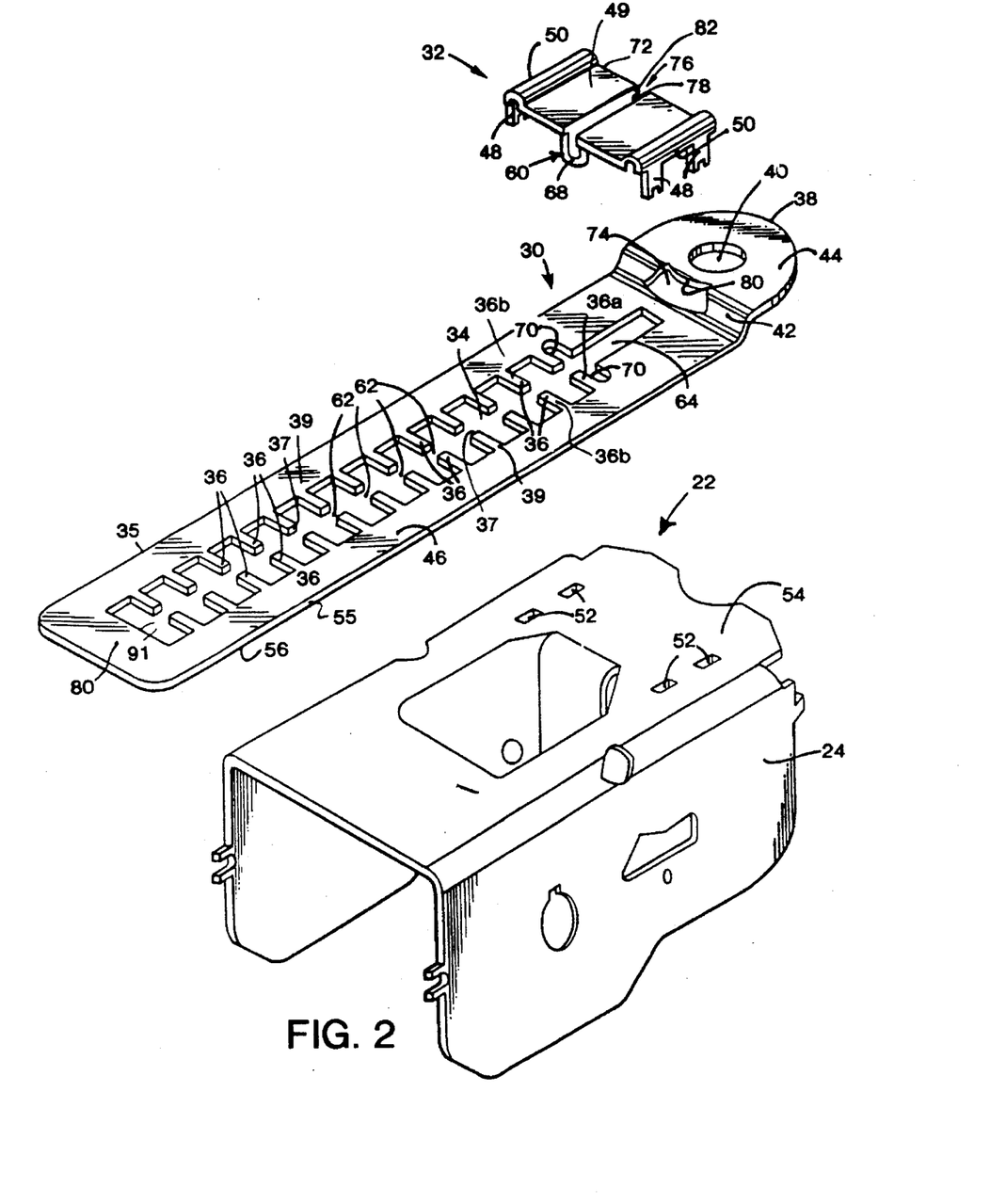
FIG. 2 is an exploded perspective view of the retractor frame and energy dissipating device of FIG. 1.

The guiding and deflecting member 32 is channel-shaped as shown in FIG. 2 with a central web 49 that is spaced from side flanges 50, each of which has a pair of staking tabs 48 on the respective side flanges. The staking tabs 48 are received in respective rectangular openings 52 in the face 54 of the retractor frame 24 for staking of the guiding and deflecting member 32 to the retractor frame 24. In assembly, the backside 56 of the strap 30 is disposed flush against the face 54 of the retractor frame 24 while both sides 50 of the guiding and deflecting member 32 are staked to the retractor frame 24. The channel-shaped member 32 has the side flanges 50 and staking tabs 48 thereon spaced apart to engage and slide along side edges 55 of the stationary strap. As best seen in FIG. 2, the guiding and deflecting member 32 has an integral, U-shaped cross-sectional, deflecting portion 60 in the middle of the web 49 projecting downwardly into the slot formed in the strap to deflect the beams 36. Preferably, the deflecting portion 68 extends sufficiently long that it bridges the space between two adjacent pairs of deflected tabs 36, and thus is guided by the deflected pairs in a straight line path down the center of the elongated slot in the strap. More specifically, the deflecting portion 60 extends the length of channel-shaped member 32 and will be in simultaneous contact with the deflected first set of tabs 36a and 36b. Thus, the guiding and deflecting member 32 straddles the strap 30 and serves to guide the retractor frame 24 for sliding movement along the length of the strap 30, with the guiding and deflecting member 32 and the retractor frame 24 to which it is staked sliding adjacent respective sides 46 and 56 of the strap 30.

Figure 7:
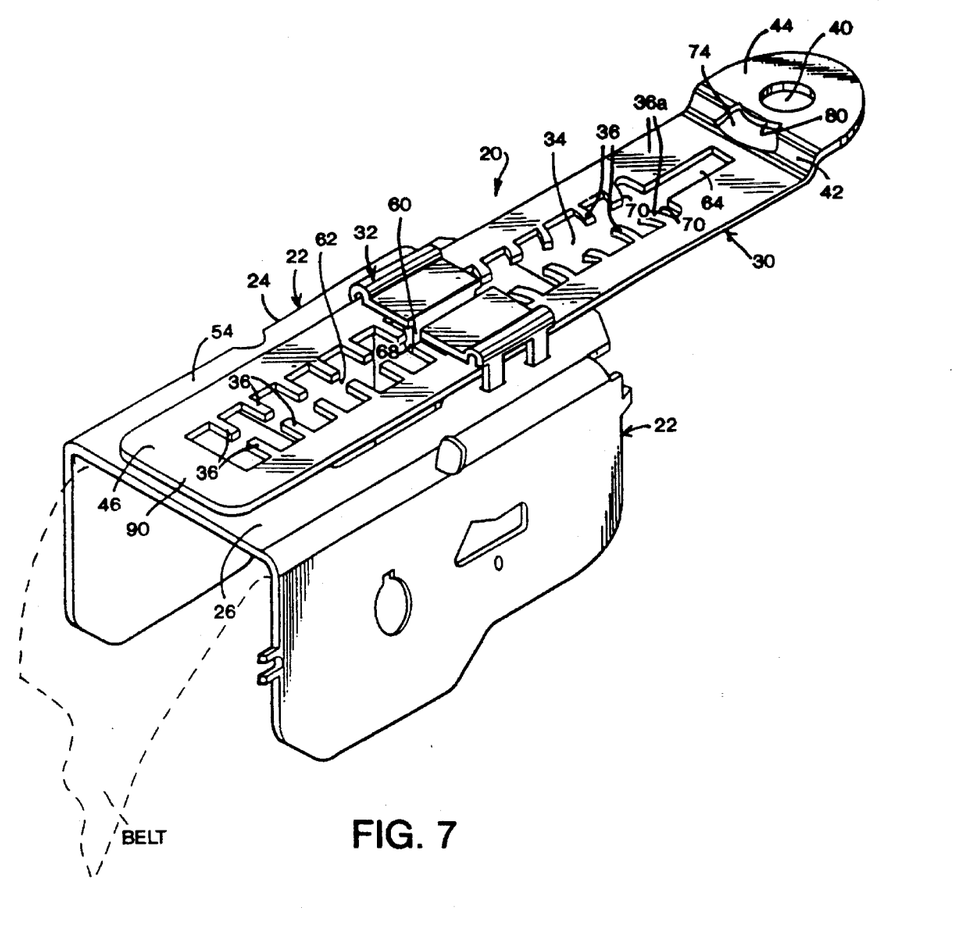
FIG. 7 is a perspective view of the retractor frame and energy dissipating device of FIG. 1, shown with the retractor frame slidably displaced along the strap and the cantilevered tabs deflected.

The cantilevered tabs 36 extending into the opening 34 of the strap 30 are preferably in opposing pairs, with the elongated region between the respective pairs of opposing tabs 36 defining an elongated channel 62 of predetermined channel width. The width of the central deflecting portion 60 is made greater than the predetermined width of the elongated channel 62. The guiding and deflecting member maintains the central deflecting portion 60 centered within the channel 62, and centered between the respective pairs of cantilevered tabs 36 upon sliding movement of the guiding and deflecting member 32 along the strap 30. Thereby, the guiding and deflecting member 32 assures that the cantilevered tabs 36 are each disposed in the path of sliding travel of the deflecting portion 60 of the guiding and deflecting member 32, and the deflecting portion 60 of the guiding and deflecting member 32 deflects both opposing tabs 36 of each respective pair of tabs 36 generally simultaneously and through equal amounts of displacement when acted upon by sufficient force, as illustrated in FIG. 7.

The retractor frame 24 is held securely in a stationary position adjacent the mounting end 38 of the strap 30 throughout typical safety belt operations until a large force is encountered, of the magnitude realized during instances of rapid vehicular deceleration. More particularly, the strap 30 has a mounting opening 64 having a width greater than the predetermined width of the elongated channel 62 and greater than the width of the central deflecting portion 60 of the guiding and deflecting member 32. The central deflecting portion 60 of the guiding and deflecting member 32 is disposed in the mounting opening 64, with the front end 68 of the central deflecting portion 60 of the guiding and deflecting member 32 disposed adjacent the back side 70 of a first pair 36a of the tabs 36. Since the width of the channel 62 between the tabs 36 is less than the width of the deflecting portion 60, the tabs 36a prevent the guiding and deflecting member 32 from sliding forward along the strap 30 until the guiding and deflecting member 32 is pulled forward with a force great enough to deflect the tabs 36a.

The deflecting and guiding member 32 has a rear end 72 disposed adjacent an arcuate slot 74 formed in the step portion 42 of the strap 30. The central deflecting portion 60 is a depending U-shape with its forward edge 68 abutting the backsides 70 of the first beams 36a and its rearward edge 78 facing a rear arcuate surface 80 on the slot 74 formed in the step portion 42 of the strap 30. The U-shaped, central deflecting portion 60 has a shoulder 76 with an overhanging portion 82 on the rear edge of central deflecting portion. Thus, it will be seen that the rear end 78 of the deflecting portion 60 is disposed directly abutting the lower end of the slot 64 of the strap 30 to prevent rearward displacement of retractor frame 24 with respect to the strap 30; and that the movement of the guide 32 and retractor 22 is restrained by deflecting portion 60, in the upward direction by surface 68 abutting surfaces 70 of the beams 36a.

The guiding and deflecting member 32 and the retractor 22 to which the guiding and deflecting member 32 is attached are maintained and secured in a substantially stationary position at the mounting end of the strap 30 during normal operating conditions in which the force or load imparted to the safety belt is less than the predetermined force required to deflect the tabs 36, and there is no permanent damage imparted to the energy management device until acted upon by a force exceeding the predetermined force required to deflect the tabs. When the retractor frame 24 is pulled forward, such as by the forward thrust of a person restrained by a restraining safety belt in a rapid vehicular deceleration with the retractor 22 locked, the forward thrust of the passenger exerts a sufficiently large forward force on the belt wound on a reel in the retractor frame 24. Then, the central deflecting portion 60 of the guiding and deflecting member 32 is pulled with the retractor and deflects the first pair of tabs 36a and moves forward along the strap 30 past the first pair of tabs 36a to deflect the second pair of tabs. It can be expected that the deflecting portion 60 of the guiding and deflecting member 32 will deflect most or all of the tabs 36. Thus, the retractor 22 will stop suddenly at the forward end portion 90 of the strap 30 upon abutment of the central deflection portion 60 of the guiding and deflecting member 32 against the forward end portion 90 of the strap 30.

The deflection of the tabs 36 as the retractor frame is slid forward along the strap converts the kinetic energy of the guiding and deflecting member 32 to work in deflecting the tabs 36 and thereby the tab deflection dissipates a portion of the energy imparted to the shoulder harness portion of the safety belt. Also, the force being applied is spread over a longer period of distance as the retractor travels along the four inch length of the slot. Accordingly, the maximum force realized by the restrained person against the shoulder harness portion of the safety belt upon rapid vehicular deceleration is significantly reduced, to provide a corresponding decrease in the forces realized by the head and chest regions of the restrained person when the seat belt and/or air bag stops further movement of the passenger relative to the vehicle. It will now be appreciated that the significant reduction in the head and chest forces imparted to the restrained person attained with the energy management device 20 of the present invention is attained with very low cost as compared with currently existing energy management systems. The designs of the illustrated and preferred strap 30 and guiding and deflecting member 32 of the present invention lend themselves to low cost production, assembly and installation.

By way of illustrative example, an energy management device 20 was constructed having a strap 30 with 9 pairs of cantilevered beams 36 disposed over 100 millimeters of travel, with each of the beam pairs requiring 2.8 kilo-Newtons of force to be deflected when tested with a tensile machine traveling at 100 millimeters per minute. The illustrated strap is about 2.5 millimeters thick with the tabs having a width about 3.0 millimeters and a length of 7 millimeters from distal end 35 to their juncture 39 with the remainder of the strap. The space 62 between distal ends 39 is 5 millimeters and the distance between adjacent pairs of beams 36 is about 11 millimeters in the longitudinal direction of the strap. The overall width of the illustrated strap is 38 millimeters. Manifestly, the size and shape of the strap and beams may be varied from this illustrated example of the invention.

Figure 5:
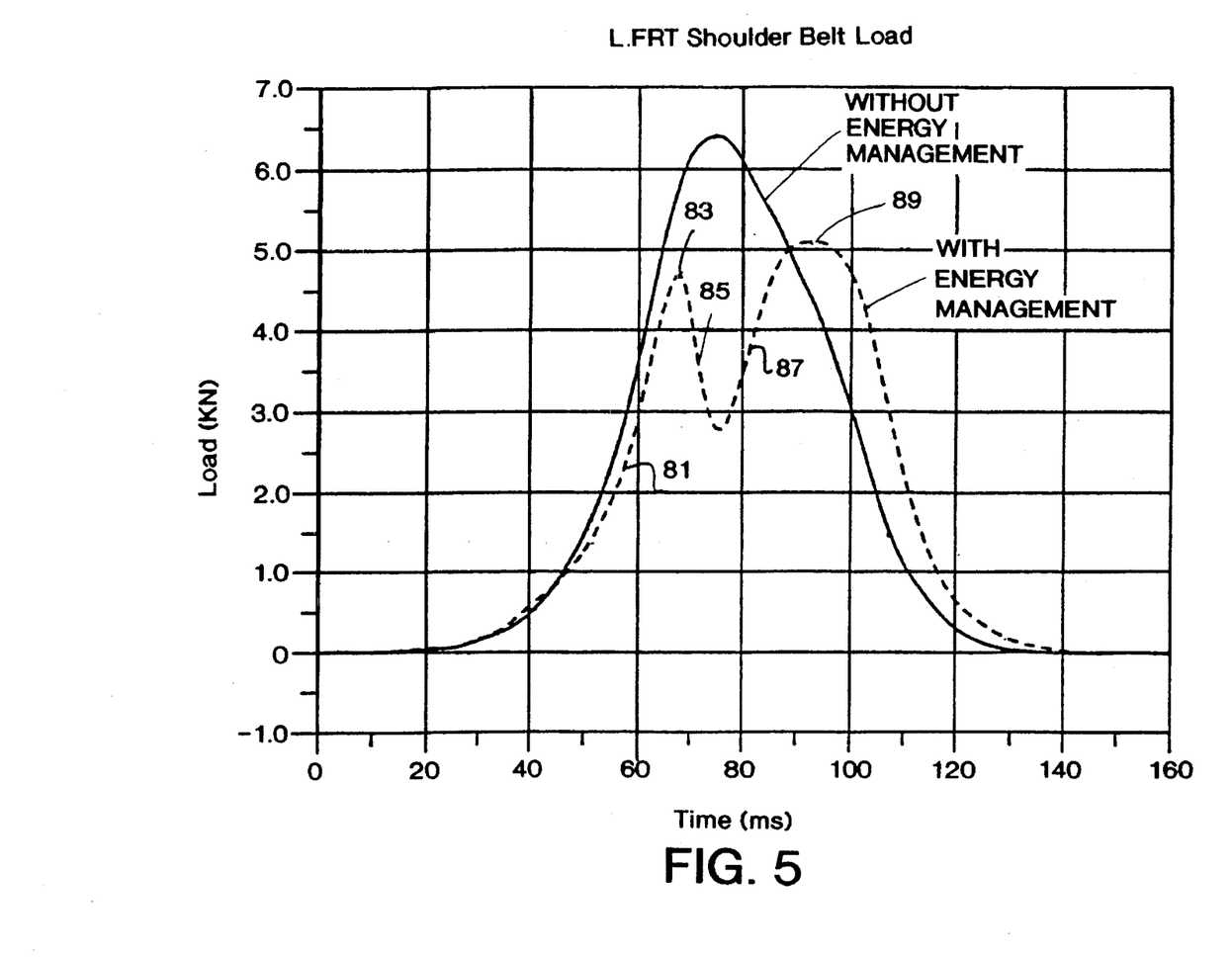
FIG. 5 is a force-time graph of the load imparted to the left, front shoulder harness of a safety belt both with energy management (dotted lines) and without energy management (solid lines), illustrating the significant force reduction attained with the energy management device of the present invention.
Figure 6:
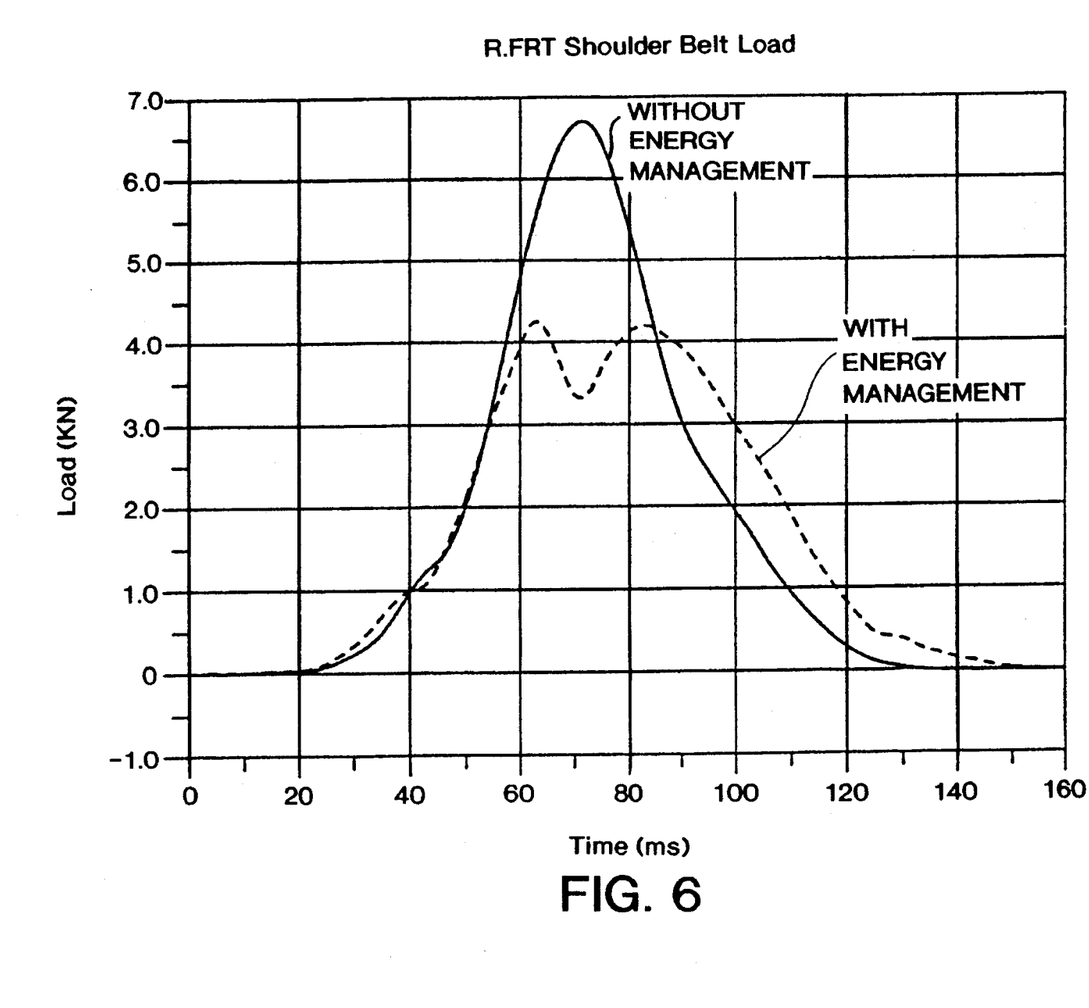
FIG. 6 is a force-time graph of the load imparted to the right, front shoulder harness of a safety belt both with and without energy management.

In this example of the invention, it was desired that for seat belt loads applied by the deflecting member of less than 2.0 kilo-Newtons that there would be no deflection of the beams 36. In this described embodiment of the invention, the first beams are deflected when the load applied thereto is at least 2.8 kilo-Newtons under the tensile tests with tensile machine. The time delay and the reduction in the maximum load imparted to the shoulder harness portion of safety belts with employment of the above illustrative energy management device 20 of the present invention is readily apparent from the graphs illustrated in FIGS. 5 and 6 for left- and right-front shoulder belt loads. The illustrated shoulder belt loads were obtained from barriers run with 50% dummies during a live 35 MPH live barrier, with a single driver and passenger. As seen in FIGS. 5 and 6, the maximum load or force imparted to the shoulder belt decreased significantly with employment of the energy management device 20 of the present invention as compared to the forces realized without the energy management device.

The energy management device used with the left front shoulder belt (FIG. 5) is the driver side seat belt in United States automobiles. The energy management curve has an initial, upwardly-sloped portion 81 that shows the force in kilo-Newtons as the slack is taken out of the shoulder belt. The deflecting portion 60 deflects pairs of beams at the first maximum point of force 83, which at about 4.7 kilo-Newtons at about 67 milliseconds. As the deflecting portion travels along the length of the strap 30, the force drops along a downwardly-sloped portion 85 to about 2.8 kilo-Newtons about 77 milliseconds. Then, the deflecting portion abuts end wall 91 at the bottom of the strap thereby preventing any further travel of the retractor and deflector 60; and the force increases along the upwardly-sloped portion 87 to a maximum peak 89 of about 5.2 kilo-Newtons at about 90 milliseconds after which the belt loading decreases. The maximum load without the energy management device of 6.3 kilo-Newtons at 77 milliseconds was reduced to a double spike load of 4.7 kilo-Newtons at 67 milliseconds, and 5.2 kilo-Newtons at 90 milliseconds. The force is also being applied over a longer distance as the retractor travels through about 4 inches when deflecting the beams. In the test of the right front shoulder belt (FIG. 6), the maximum loads were reduced from 6.8 kilo-Newtons at 70 milliseconds to 4.3 kilo-Newtons at 62 milliseconds, and 4.2 kilo-Newtons at 81 milliseconds. If the second peak 89 is the maximum loading using this energy management device, there is a time delay, a longer distance traveled while the force is being applied and a reduction in maximum load application for both energy management devices graphed in FIGS. 5 and 6. The time delay, maximum loading, and longer distance are significant factors in the complex formula of rating the performance of a safety system. For the specific example described herein, the chest G's applied by the belt are reduced by about 27% when using the invention. Also, the HIC numbers, which stand for Head Injury Criteria, are reduced by 18 to 26 percent in this instance. Further, the result is lower maximum loads being applied to the occupant and to the safety belt hardware. The occupant first engages the shoulder belt before the air bag deploys; hence the time delay brought about by the energy management device aids in allowing the air bag to be deployed relatively more close in time to the maximum load than when the energy management device is not provided. The United States Government's NCAP system star rating is also improved with the use of the energy management device. Thus, it will be seen that this energy management device results in lower belt loads applied to occupant and safety belt hardware, lower HIC numbers, lower chest G's and improved occupant performance in crash events.

Thus, as seen in the graphs of FIGS. 5 and 6, the energy management device 20 of the present invention delays the onset of the maximum load imparted by the belt to a person, which is a desirable characteristic in designing an overall, comprehensive restraining system. For instance, even a small delay in the onset of large loads imparted to the belt may allow to a person sufficient time for deployment of an air bag to provide protection to the restrained person prior to, or during, the maximum load being exerted on the belt and the passenger, to reduce the acceleration of the chest region of the user.

Advantageously, as mentioned above, the energy management device of the present invention may be formed of only two components, a guiding and deflecting member and a strap, each of which may be stamped, sheet metal pieces for low cost production. Also, the guiding and deflecting member may be easily staked to the retractor frame for simple, low-cost assembly. Additionally, the energy management device of the present invention lends itself to use with currently-existing retractor frames, without the need to redesign the currently-existing retractor frames to accommodate an energy management device.

Figure 4:
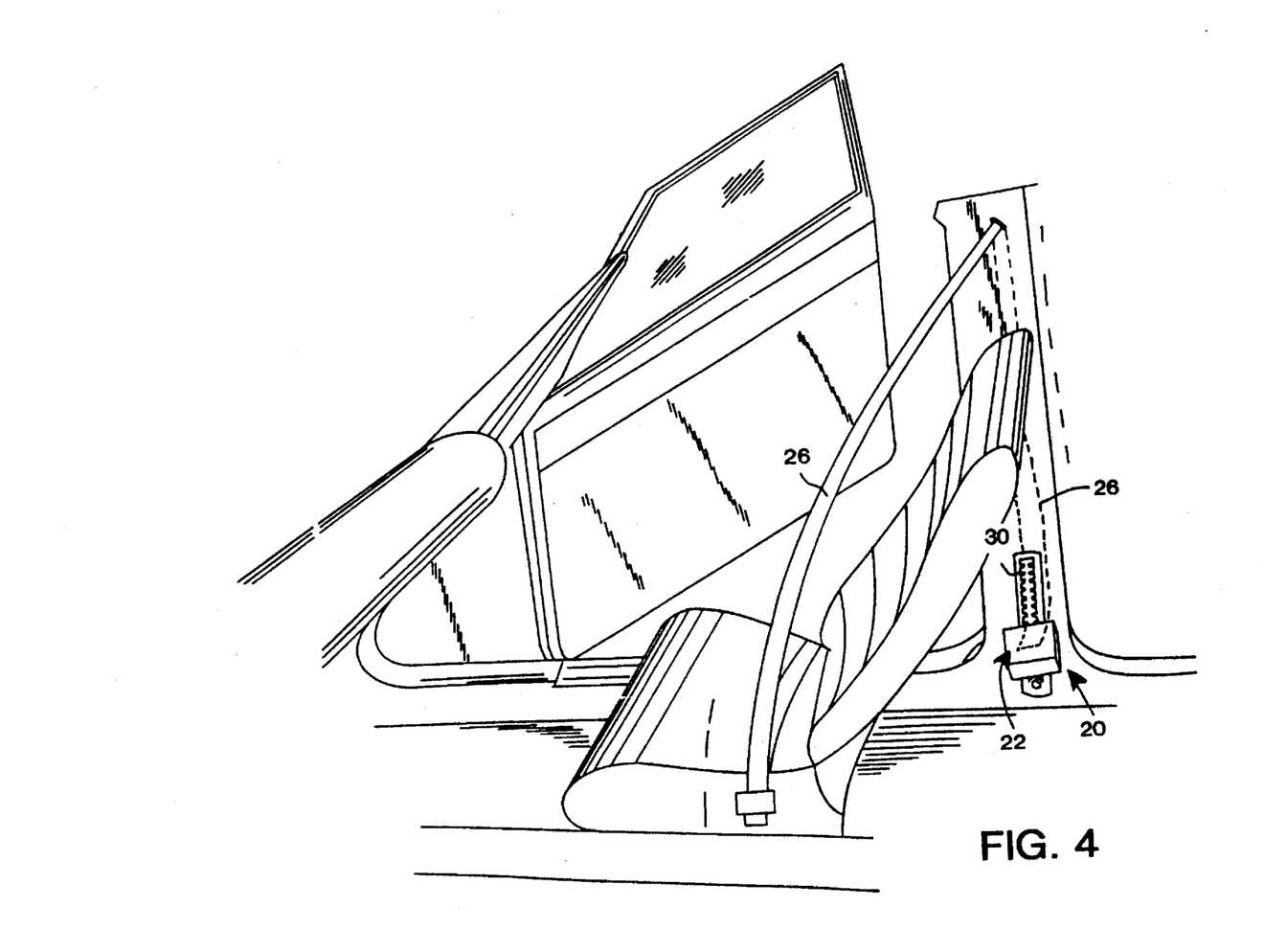
FIG. 4 is a perspective view of the retractor and energy dissipating device of FIG. 1 mounted in a vehicle with the safety belt fastened.

The retractor and energy management device are compact enough to be mounted to the vehicle behind trim, as illustrated in FIG. 4. When actuated with sufficient force, the retractor may pull out of the trim. However, as discussed above, the strap 30 remains solidly bolted to the vehicle, and the solid forward end portion 90 of the strap 30 prevents disengagement of the retractor 22 from the strap 30.

In summary, the beams 36 are constructed to withstand deflection until acted upon by a predetermined force which is greater than the forces encountered during normal operating conditions. Therefore, the retractor 22 and the guiding and deflecting member 32 mounted to the retractor remain stationary at one end of the strap throughout normal operating conditions of the vehicle, retained in place by first beams 36a directly adjacent the guiding and deflecting member 32. However, in a rapid vehicular deceleration, the forward thrust of the passenger may impart a large load to the shoulder harness portion of a safety belt greater than the load required to deflect the pairs of tabs 36. During the rapid vehicular deceleration, the retractor 22 to which an end of the belt is connected locks to prevent further unwinding of the belt from the retractor 22. Therefore, the forward thrust of the restrained person exerts a force on the belt, which pulls the locked retractor 22 forward along the strap 30. The guiding and deflecting member 32 and the retractor 22 to which it is mounted slide forward along the strap 30 with the central deflecting portion 60 of the guiding and deflecting member 32 deflecting the beams 36 in their respective pairs as the retractor and guiding and deflecting member slide forward along the strap 30. The deflection of the beams 36 converts kinetic energy to work so that a portion of the energy imparted to the shoulder harness portion of the safety belt is dissipated by the deflection of the beams 36 as the retractor 22 slides forward along the strap 30. Since the beams 30 are deflected, the strap 30 must be replaced following actuation of the device 20.

When the energy management device is used without a retractor, the guiding and deflecting member could be stationary and the load from the belt could be applied to the strap to produce the relative sliding movement between the strap and the elongated member. While the preferred connectors between the deflecting and guiding member are the staked tabs inserted in holes in the retractor frame to provide a low-cost fastening, it will be appreciated that the connectors could be more expensive fasteners or could be portions of the retractor frame itself.

While the invention is described with respect to a preferred embodiment, it is recognized that variations may be made without departing from the inventive concepts of the present invention. For instance, while in the preferred embodiment each of the tabs deflects at approximately the same deflection force, it is recognized that it may be desirable to have variation in the deflection strength of the tabs to allow selective customization of the force-time profile to suit particular desirable parameters. Also, the opposed cantilevered beams with a space therebetween may be joined together at their distal ends to remove the gap therebetween, and present a single beam or web that is to be burst and deflected as the deflection member breaks the beam.

What is claimed is:

1. An energy management device for dissipating energy from a moving load, comprising:
   a strap having a plurality of deflectable beams which resist deflection until acted upon by a predetermined load;
   a guiding and deflecting member straddling the strap and guiding therealong for linear sliding movement relative to and along the strap;
   a beam-deflecting portion on the guiding and deflecting member for contact with said plurality beams of said strap upon the relative sliding movement between the guiding and deflecting member and the strap; and
   a connector portion on the guiding and deflecting member for being connected to the moving load and being slidable, relative to the strap under the influence of said moving load when acted upon by a load greater than or equal to said predetermined load required to deflect the beams, with the beam-deflecting portion of the guiding and deflecting member deflecting at least a portion of said plurality of deflectable beams during relative sliding of the guiding and deflecting member relative to the strap with the deflection of the beams dissipating a portion of the energy of the moving load.

2. An energy management device in accordance with claim 1 in which:
   the plurality of deflectable beams of the strap comprises a plurality of opposing pairs of cantilevered tabs with each pair of tabs defining a gap of predetermined width therebetween, with the plurality of respective gaps between the tabs defining an elongated, longitudinally extending channel having said predetermined width;
   the beam-deflecting portion of the guiding and deflecting member has a width greater than said predetermined width of the channel; and
   the guiding and deflecting member maintains the beam-deflecting portion of the guiding and deflecting member centered in the channel to deflect the beams in their respective pairs as the guiding and deflecting member slides along the strap.

3. An energy management device in accordance with claim 2 in which the guiding and deflecting member is disposed adjacent a first pair of said pairs of tabs of the strap which resist deflection until acted upon by the guiding and deflecting member with a predetermined load to maintain the guiding member in a stationary position along the strap until acted upon by a load equal to or greater than said predetermined load.

4. An energy management device in accordance with claim 3 in which each of said pair of tabs of the strap deflect when subjected to said predetermined load.

5. An energy management system for reducing the energy in a shoulder harness portion of a restraining safety belt, comprising:

- a safety belt retractor connected to said shoulder harness portion of the restraining belt and having means for locking upon rapid vehicular deceleration to prevent unwinding of the belt from the retractor;
- a strap for mounting to the vehicle and having a plurality of deflectable beams;
- a guiding and deflecting member attached to the retractor and straddling the strap, the guiding and deflecting member guiding the retractor for linear sliding movement of the retractor, together with the guiding and deflecting member along the strap;
- a beam-deflecting portion on the guiding and deflecting member disposed for contact with said beams of the strap upon sliding movement of the guiding and deflecting member along the strap, with the beam-deflecting portion deflecting at least a portion of said plurality of beams of the strap upon sliding of the retractor and guiding and deflecting member along the strap with the beam deflections dissipating a portion of the energy in the shoulder harness portion of the safety belt.

6. An energy management system in accordance with claim 5 wherein:

- a retractor frame wall on the retractor has a flat sliding surface thereon;
- the strap has a long, flat sliding surface in abutment with the retractor flat sliding surface with the retractor; and
- the guiding and deflecting member is channel-shaped and is attached to the retractor frame wall with the strap disposed in a channel.

7. An energy and management system in accordance with claim 5 wherein:

- the guiding and deflecting member comprises a channel-shaped body straddling the strap, having a central web and a pair of side flanges;
- the beam-deflecting portion is a depending portion bent from the central web and projecting into a groove into the strap and to abut beams on the strap.

8. An energy and management system in accordance with claim 7 wherein staking tabs stake the channel-shaped body to the retractor.

9. An energy management system in accordance with claim 5 in which the deflecting portion abuts a first one of said plurality of beams and said first beam resists deflection until acted upon by a predetermined force, the first tab preventing sliding of the guiding and deflecting member along the strap until acted upon by a force equal to or greater than said predetermined force required to deflect the first beam.

10. An energy management device in accordance with claim 5 in which:

- the plurality of deflectable beams of the strap each comprises opposing pairs of cantilevered tabs with each pair of tabs defining a gap of predetermined width therebetween, with the plurality of respective gaps between the tabs defining an elongated, longitudinally extending channel; and
- the beam-deflecting portion having a width greater than said predetermined width of the channel, the guiding and deflecting member maintaining the beam-deflecting portion centered in the channel to deflect the tabs in their respective pairs as the guiding and deflecting member and retractor slide along the strap.

11. In a seat belt system having a seat belt, the combination comprising:

- a retractor to which the safety belt is attached, the retractor having a frame;
- a guiding and deflecting means attached to the retractor frame and having a beam-deflecting means;
- a strap mounted to the vehicle and extending between the retractor frame and the guiding means to maintain engagement of the retractor frame and attached deflecting member with the strap and to guide the retractor frame and attached deflecting means for linearly sliding movement along the strap;
- a row of deflectable, cantilevered beams on the strap disposed in the path of travel of the beam-deflecting means, said deflectable beams having a known size and shape and being deflected at a predetermined force, said deflecting means abutting the deflectable means and preventing the retractor and the attached deflecting means from moving past the first beam until acted upon by a force equal to or greater than said predetermined beam-deflecting force;
- the deflecting means being slidable along the strap together with the retractor housing to which it is attached to deflect said deflectable beams when the safety belt force imparted to the retractor frame is equal to or greater than said predetermined beam-deflecting force, the deflection of the beams dissipating at least a portion of the force imparted to the safety belt.

12. An energy management device in accordance with claim 11 in which each of said beams of the strap deflect when subjected to said predetermined load.

* * * * *